3,189,579
CARBAMATES AND POLYURETHANES BASED UPON 4-AMINOMETHYLCYCLOHEXANEMETHANOL
John R. Caldwell, Kingsport, Tenn., assignor to Eastman Kodak Company, Rochester, N.Y., a corporation of New Jersey
No Drawing. Filed May 18, 1961, Ser. No. 110,862
18 Claims. (Cl. 260—77.5)

This invention relates to carbamates or urethanes of 4-aminomethylcyclohexanemethanol and polymers produced therefrom. A particular embodiment of this invention relates to the preparation of novel carbamates by the reaction of 4-aminomethylcyclohexanemethanol with alkyl chloroformates and the preparation of polyurethanes and polyester-urethanes by the polymerization of said alkyl carbamates.

The alkyl carbamates or urethanes of this invention are particularly useful in the preparation of linear polyurethanes and polyester-urethanes that are valuable for the production of fibers, films, molded objects and protective coatings.

As used in this specification the term 4-aminomethylcyclohexanemethanol includes either or a mixture of both cis and trans isomers. The preferred usage is at least 50% of the trans isomers. The letters AMCM have the same meaning. A useful mixture of isomers is about 70% trans plus 30% cis. Both high and low melting linear condensation polymers can be prepared from either isomer of 4-aminomethylcyclohexanemethanol. The higher melting polymers are generally obtained when the 4-aminomethylcyclohexanemethanol used in the preparation of the alkyl carbamate or urethane to be polymerized has a high content of trans isomer. These higher melting polymers, including both polyurethanes and polyester-urethanes or modified urethanes, are advantageous for the preparation of fibers and films. The polymers melting at between 100–200° C. are especially useful in molding compositions.

This invention also relates to the process involved in the preparation of alkyl carbamates from AMCM and the preparation of linear condensation polymers from said alkyl carbamates. It also relates to films, fibers and other products produced from these polymers. It was particularly surprising to find that alkyl carbamates or urethanes from which polyurethanes and polyester-urethanes could be prepared could be made from AMCM in view of the fact that the prior art discloses only such polyurethanes as those made from hydroxypiperidine derivatives, for example, as described in U.S. Patent No. 2,915,505, wherein the general structural unit has the formula

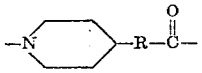

R being —O— or —O-alkylene, the nitrogen atom being combined in the ring system.

The utility of the novel alkyl carbamates or urethanes of the present invention is vividly demonstrated by the unexpectedly high melting temperatures, chemical stability, physical stability, dyeability, weather resistance, resistance to heat distortion, and high resistance to hydrolysis of the polymers prepared from said alkyl carbamates or urethanes. The polyurethanes and polyester-urethanes of my invention are valuable not only for the production of strong, elastic fibers, but for use in the preparation of molded objects having a high impact strength, said molded objects having a transparency which is retained under severe conditions of use. In addition the polymers are also useful as protective coatings, especially where resistance to scuffing and marking is important.

The objects of the present invention include providing a novel carbamate or urethane and its use in formation of linear condensation polymers having the advantageous properties enumerated as well as products produced therefrom as described. Other objects will become apparent elsewhere herein.

According to a preferred embodiment of this invention alkyl urethanes or carbamates are made by treating AMCM with alkyl chloroformates in the presence of an acid-accepting agent such as sodium carbonate or sodium hydroxide, as illustrated by the following equation:

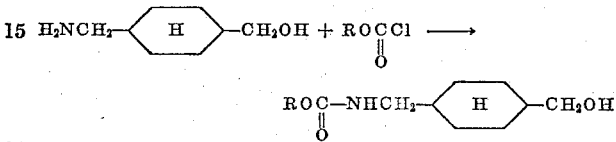

R is a lower alkyl group having from 1 to 4 carbon atoms.

The alkyl carbamate or urethane thus produced is heated in the presence of a suitable catalyst to eliminate an alcohol and build up a polymer chain in accordance with the following reaction:

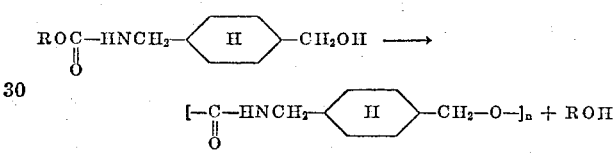

AMCM, together with several methods for the preparation thereof, is disclosed in a co-pending application, Serial No. 40,188, filed June 1, 1960, by our co-workers Elam and Poe.

Suitable catalysts for use in the above-described polymerization reaction include metals and metal compounds that are commonly used in the production of linear polyesters by the ester-interchange reaction. Catalysts of this type are described in U.S. Patent Nos. 2,720,502, 2,727,881; 2,720,504; 2,720,505; 2,720,506; and 2,720,507. Catalysts containing tetravalent titanium are of particular value. Compounds of zinc, cobalt, manganese, cerium, and antimony are useful.

In another embodiment of this invention the alkyl carbamate or urethane formed by the reaction of AMCM with an alkyl chloroformate is converted to a polyester-urethane or modified polyurethane by condensation with one or more bifunctional compounds such as a dicarboxylic acid, a dicarboxylic acid ester, a glycol, or diamine. Polyurethanes modified by the incorporation therein of amino acids may also be produced from our alkyl carbamates or urethanes.

The polymers may be prepared in general by either a melt phase or solid phase process such as described in U.S. Patent No. 2,901,466. The polymerization may be carried out in two stages. The initial stage is carried out in the temperature range of from about 180–230° C. in an inert atmosphere. The final stage is carried out under reduced pressure and with stirring. For example, a prepolymer having an inherent viscosity of from about 0.3 to about 0.5 may be first prepared by stirring the melt in vacuum and then granulating the prepolymer to a particle size of from about 0.01 to about 0.03 inch. The granules are then heated in a vacuum for about 1–4 hours at a temperature somewhat below the melting point to build up the viscosity. This particular method is especially valuable in case of polyurethanes or polyester-urethanes having a melting point higher than about 250° C. When a modified polyurethane or polyester-urethane is prepared, substantially equal molar amounts of AMCM and the dicarboxylic acid or its ester and the glycol or diamine are generally used.

When bifunctional reactants or constituents such as dicarboxylic acids and their esters, glycols, and diamines are used in the formation of polyurethane or polyesterurethane, they should contain no other reactant (functional) substituents which would interfere with polyurethanes as defined by Carothers in his earlier work in this field.

This invention can be further illustrated by the following examples of preferred embodiments, although it will appear that these examples are included merely for the purpose of illustration and are not intended to limit the scope of the invention unless otherwise specifically indicated.

EXAMPLE 1

*Preparation of ethyl [4-(hydroxymethyl)cyclohexyl]methyl carbamate*

429 g. (3 moles) of 4-aminomethylcyclohexanemethanol were dissolved in 500 cc. of dioxane and 500 cc. water, and 212 g. (2 moles) sodium carbonate were added. The mixture was stirred and 358 g. (3.3 moles) ethylchloroformate were added dropwise over a period of 70 minutes. The temperature was kept at 25° by means of a water bath. The mixture was then stirred at 25° for two hours longer. The organic layer was separated and the dioxane was distilled off. The residue was heated with 500 cc. of benzene and 50 g. of anhydrous sodium sulfate. The clear supernatant liquid was decanted from the salt residue. The benzene was distilled off, and the residue was distilled in vacuum. The product boiled at 162° C. at 0.1 mm. Hg pressure. It weighed 203 g. The product crystallized after standing 24 hours and at this point melted at 63–65° C. This material showed a fairly wide melting range, the aminoalcohol used as starting material being a mixture of about 70–30 cis-trans-isomers.

The carbamate made from the pure trans-isomer melted at 70–71° C.

Using methyl chloroformate, the methyl carbamate was made from the 70–30 isomer mixture of aminoalcohols. It melted at 72–78°. The butyl carbamate melted at 35–43°.

EXAMPLE 2

*Preparation of polyurethane*

15 g. of ethyl [4-(hydroxymethyl)cyclohexyl]methyl carbamate were placed in a vessel equipped with stirrer, an inlet for purified nitrogen and a distillation column. Titanium isopropoxide (0.01 g.) was added as catalyst, and the mixture was stirred at 200° C. in a nitrogen atmosphere. Ethyl alcohol was distilled through the column. The temperature was raised to 240° C. during a period of 30 minutes and stirring was continued at this temperature for 15 minutes. A vacuum of 0.1 mm. was applied and the melt increased in viscosity. The reaction was stopped in 35 minutes as the melt had become very viscous.

The product was clear and colorless when cool. It softened at 200° C. and melted at 215–225° C. Molded articles made from the polymer were transparent and had a high impact strength. This polymer had an inherent viscosity of 0.61 as measured in a solvent composed of 60 phenol–40 tetrachlorethane.

This polymer was made from aminoalcohol that contained about 65–70% trans-isomer.

EXAMPLE 3

*Preparation of polyurethane*

Using the procedures described in Examples 1 and 2, a polyurethane was made from 4-aminomethylcyclohexanemethanol that contained 95–100% of the trans-isomer. It melted at 240–255°. This polymer was used in the production of fibers, films and molded objects.

EXAMPLE 4

*Preparation of modified polyurethane*

100 g. of ethyl [4-(hydroxymethyl)cyclohexyl]methyl carbamate, 14.4 g. of 1,4-cyclohexanedimethanol, 15 g. of dimethyl terephthalate and 0.02 g. of titanium tetrabutoxide were placed in a vessel equipped with a stirrer, an inlet for purified nitrogen, and a distillation column. The mixture was stirred at 200° C., and a mixture of methyl and ethyl alcohols was removed through the column. The temperature was then raised to 250° C. and held for 15 minutes. A vacuum of 0.1 mm. was applied, and the melt was stirred for 30–40 minutes. A high viscosity product was obtained. The polymer softened at a temperature of 170–180°.

The polyester-urethane was molded into plastic objects.

EXAMPLE 5

*Preparation of modified polyurethane*

100 g. of ethyl [4-(hydroxymethyl)cyclohexyl]methyl carbamate, 19.4 g. of dimethyl terephthalate and 11.6 g. of hexamethylene diamine were treated as described in Example 4. The polyamide-urethane softened at 160–180°. It is useful as a molding plastic and for the production of transparent films.

Polymers as described above were formed into fibers which could be oriented by stretching to improve their properties if desired, especially for textile fabrics. Molding compositions can also be prepared from such polymers. The polymers are especially resistant to weathering. They are also useful as protective coatings. An outstanding property is their hydrolytic stability in combination with an unusually well-balanced group of other desirable properties.

Although the invention has been described in considerable detail with reference to certain preferred embodiments thereof, it will be understood that variations and modifications can be affected without departing from the spirit and scope of the invention as defined in the appended claims.

I claim:

1. A carbamate having the formula

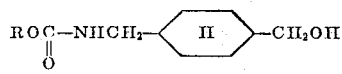

wherein R is an alkyl group containing from 1 to 4 carbon atoms.

2. Methyl 4-(hydroxymethyl)cyclohexylmethyl carbamate.

3. Ethyl 4-(hydroxymethyl)cyclohexylmethyl carbamate.

4. Propyl 4-(hydroxymethyl)cyclohexylmethyl carbamate.

5. Butyl 4 - (hydroxymethyl)cyclohexylmethyl carbamate.

6. A linear highly polymeric polymer of an alkyl carbamate prepared from 4-aminomethylcyclohexanemethanol and an alkyl chloroformate.

7. A polymer as defined by claim 6 wherein the alkyl group contains from 1 to 4 carbon atoms.

8. A polymer as defined by claim 6 wherein the melting point is at least 200° C.

9. A polymer as defined by claim 6 wherein the 4-aminomethylcyclohexanemethanol is from 50 to 100% trans isomer.

10. A linear highly polymeric polyurethane characterized by the recurring structural unit having the formula

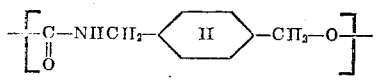

11. A linear highly polymeric reaction product of the following constituents:

(A) an alkyl carbamate having the following formula:

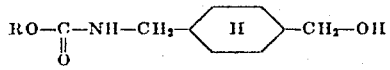

wherein R is an alkyl group having from 1 to 4 carbon atoms, (B) a bifunctional compound selected from the group consisting of dicarboxylic acids and esters thereof, and (C) a bifunctional compound selected from the group consisting of diamines and glycols, said compounds (B) and (C) being organic compounds normally useful in preparing urethane polymers and characterized by being composed of carbon and hydrogen atoms in addition to said bifunctional groups.

12. The linear highly polymeric product produced by the process consisting essentially of heating ethyl-4-(hydroxymethyl)cyclohexylmethyl carbamate at a temperature of at least 200° C. in the presence of an ester-interchange catalyst under conditions such that a molecular equivalent of ethanol is removed.

13. A polymer as defined by claim 11 wherein the constituents are ethyl [4-(hydroxymethyl)cyclohexyl]methyl carbamate, dimethyl terephthalate and 1,4-cyclohexanedimethanol.

14. A polymer as defined by claim 11 wherein the constituents are ethyl [4-(hydroxymethyl)cyclohexyl]methyl carbamate, dimethyl terephthalate and hexamethylene diamine.

15. A fiber of a polymer as defined by claim 6.

16. A fiber of a polymer as defined by claim 10.

17. A process for the preparation of an alkyl carbamate which comprises treating 4 - aminomethylcyclohexanemethanol with an alkyl chloroformate where in the alkyl group contains from 1–4 carbon atoms in the presence of an acid-accepting agent and collecting the alkyl carbamate product.

18. A process for the preparation of polyurethane-type polymers which comprises heating a compound having the formula

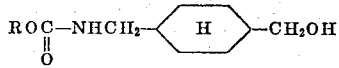

wherein R is an alkyl group containing 1–4 carbon atoms in the presence of a polyesterification catalyst, thereby eliminating an alcohol and forming a polymer characterized by a polymer chain containing a repeating linkage having the formula

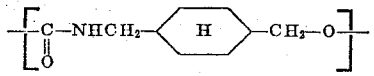

References Cited by the Examiner

UNITED STATES PATENTS

| | | | |
|---|---|---|---|
| 2,181,663 | 3/39 | Martin | 260—77.5 |
| 2,692,275 | 10/54 | Bortnick | 260—468 |
| 2,954,396 | 9/60 | Ayers | 260—468 |
| 3,030,254 | 4/62 | Albert | 260—77.5 |

LEON J. BERCOVITZ, *Primary Examiner.*

H. N. BURSTEIN, *Examiner.*